US005885152A

United States Patent [19]
Wardlaw

[11] Patent Number: 5,885,152
[45] Date of Patent: Mar. 23, 1999

[54] AUTOMOTIVE VENTILATION HOUSING WITH SELF SUPPORTING FILM VALVE HAVING A CONVEX SEMI-CYLINDRICAL SHAPE

[75] Inventor: Kenneth Lawrence Wardlaw, Southfield, Mich.

[73] Assignee: General Motors Corporation, Detroit, Mich.

[21] Appl. No.: 62,692

[22] Filed: Apr. 20, 1998

[51] Int. Cl.[6] .................................................. B60S 1/54
[52] U.S. Cl. .......................... 454/121; 137/351; 251/145
[58] Field of Search ........................... 454/121, 69, 143; 137/351; 251/145

[56] References Cited

U.S. PATENT DOCUMENTS

| | | | |
|---|---|---|---|
| 4,084,616 | 4/1978 | Tragert | 137/625.4 |
| 5,009,392 | 4/1991 | Ostrand | 251/180 |
| 5,105,730 | 4/1992 | Smith | 454/161 |

*Primary Examiner*—Harold Joyce
*Assistant Examiner*—Derek S. Boles
*Attorney, Agent, or Firm*—Patrick M. Griffin

[57] ABSTRACT

A film valve designed to replace a semi cylindrical, solid rotary valve, which rolls the film against or away from the perimeter seal of an HVAC outlet opening without relative rubbing. Spring biased take up rollers journaled on V shaped, resilient wire support legs keep a film sheet biased against interleaved, arcuate support fingers to hold the film in the necessary curved shape. The curved film sheet rolls up or winds out from the rollers as the legs are pushed toward one another, or allowed to swing away from one another. The film rolls down onto or up and off of the foam seal surrounding the outlet opening without relative rubbing.

3 Claims, 6 Drawing Sheets

AUTOMOTIVE VENTILATION HOUSING WITH SELF SUPPORTING FILM VALVE HAVING A CONVEX SEMI-CYLINDRICAL SHAPE

TECHNICAL FIELD

This invention relates to automotive ventilation system valves in general, and specifically to a rotary film valve which maintains a convex, semi cylindrical shape in a self supporting manner, and which can moved along the interior surface of the perimeter of the housing opening without substantial relative rubbing.

BACKGROUND OF THE INVENTION

Automotive ventilation systems, often called HVAC systems (heating, ventilation and air conditioning systems) typically include a large, hollow housing located just behind the instrument panel of the vehicle interior. The housing includes the two heat exchangers, the cold evaporator core and hot heater core, as well as the various valves and doors that route intake air through or around the two to create outlet air of a desired temperature. Outlet openings in the housing and instrument panel direct the air up at the windshield, forwardly at the occupant, or downwardly at an occupants' feet. These openings are covered or uncovered by a suitable valve, as selected by the vehicle occupant. Typically, the outlet openings, in descending order of height, are called defrost, air conditioning, and heat, although air of any temperature may be directed through any of them.

Different valves have been used to selectively cover and uncover the outlet openings, depending on the shape and orientation of the openings. In designs where the perimeters of the outlet openings are disposed in flat planes, it is relatively easy to use a so called film valve. In a film valve a belt or sheet of flexible film is stretched over rollers into one or more straight runs, which reside just behind the perimeter edges of the outlet opening or openings. As the film belt rolls around the rollers, back and forth, windows and solid portions in the belt alternately register with the outlet openings, covering and uncovering them. One drawback is the conflict between tightness of the seal and relative rubbing. If the surface of the belt is held flush against the interior surface of the perimeter edges of the outlet opening (usually against a foam seal that surrounds the opening), there is a frictional rubbing that retards the motion of the belt. If it is not held flush against the foam seal, there is not a complete blockage of air. Another known outlet valve is a rotary valve. With a rotary valve, the various outlet openings have perimeter edges disposed in semi cylindrical arcs and a semi cylindrical solid door swings up and down inside the housing to cover and uncover the openings. Seal rubbing is also a problem with a rotary valve. Another drawback with a solid rotary valve is that it must be designed with overtravel, that is, it must swing completely past the opening perimeter in order to completely uncover it, which detracts from compactness.

Designs have been proposed in which a film belt is used to cover and uncover outlet openings which are curved, rather than flat. This requires additional structure since the natural orientation for a belt run is flat, the shape that it naturally takes on when stretched over a pair of rollers. As shown in U.S. Pat. No. 5,105,730, the belt must be stretched over a rigid, concave curved supporting frame keep it in the necessary curved shape. This worsens the rubbing friction problem, since the film belt is now sandwiched between both the outlet opening's perimeter edge seal and the added supporting frame. An even earlier design, proposed for a domestic room air conditioner, appears to eliminate or reduce the rubbing by running a continuous, solid loop of film back and forth along a curved, rigid, but concave supporting frame. The frame is located behind a pair of side by side outlet openings, and the center of the belt loop is pinned to the frame, half way between the openings. Two rollers are spring biased apart inside the loop so as to keep it taught. The rollers roll back and forth to shift each half of the loop back and forth cover or uncover one or the other of the side by side openings. This design, while it largely eliminates rubbing, would not be adaptable to the automotive HVAC environment. The supporting frame that gives the belt run its shape must be concave or, at best, flat, and could not be convexly curved. In addition, the potential motion of the film belt back and forth is limited by the fact that it has to be pinned in the center to the frame. The rigid supporting frame needed in either design is, of course, an additional part that increases expense and takes up space within the housing.

SUMMARY OF THE INVENTION

The invention provides a self supporting film valve that swings in a rotary motion, which needs no separate supporting frame to maintain it in a convexly curved shape, and which seals flush and tight to outlet opening without relative rubbing.

In the preferred embodiment disclosed, a pair of film take up rollers is supported on a pair of resilient supporting frame legs, which radiate in a V shape from the axis of the same cylindrical envelope on which the outlet openings are oriented. The take up rollers are biased in opposite directions about their axes so as to continually wind the film up when the legs move together, or to wind the film out when the legs move apart. Interleaved arcuate support fingers on each supporting arm rest just behind the film sheet, disposed on a semi cylindrical arc concentric to the outlet opening. The opposing tensions in the take up rollers keep the film sheet taught against the fingers, thereby self supporting the film sheet into an arcuate shape that can be pressed flush against the edges of the opening to cover it tightly. When the film sheet is fully expanded, its arcuate width is sufficient to cover the whole opening, edge to edge. When the film sheet is contracted to any extent, the outlet opening is uncovered to the same extent. A pair of cooperating fixed stops and movable actuators allow either leg to be moved toward or away from the other leg, thereby contracting the film sheet as either roller is moved toward or away from an opposed straight edge of the outlet opening. Concurrently, the film sheet is wound up and away from the perimeter the outlet opening, or wound out and along the perimeter. Unlike conventional film valves and rigid rotary valves, as the outlet opening is covered and uncovered, there is no relative seal rubbing. Unlike solid, curved rotary valves, the rollers need not travel significantly past the edges of the opening in order to uncover it.

DESCRIPTION OF THE PREFERRED EMBODIMENT

Figure 1:
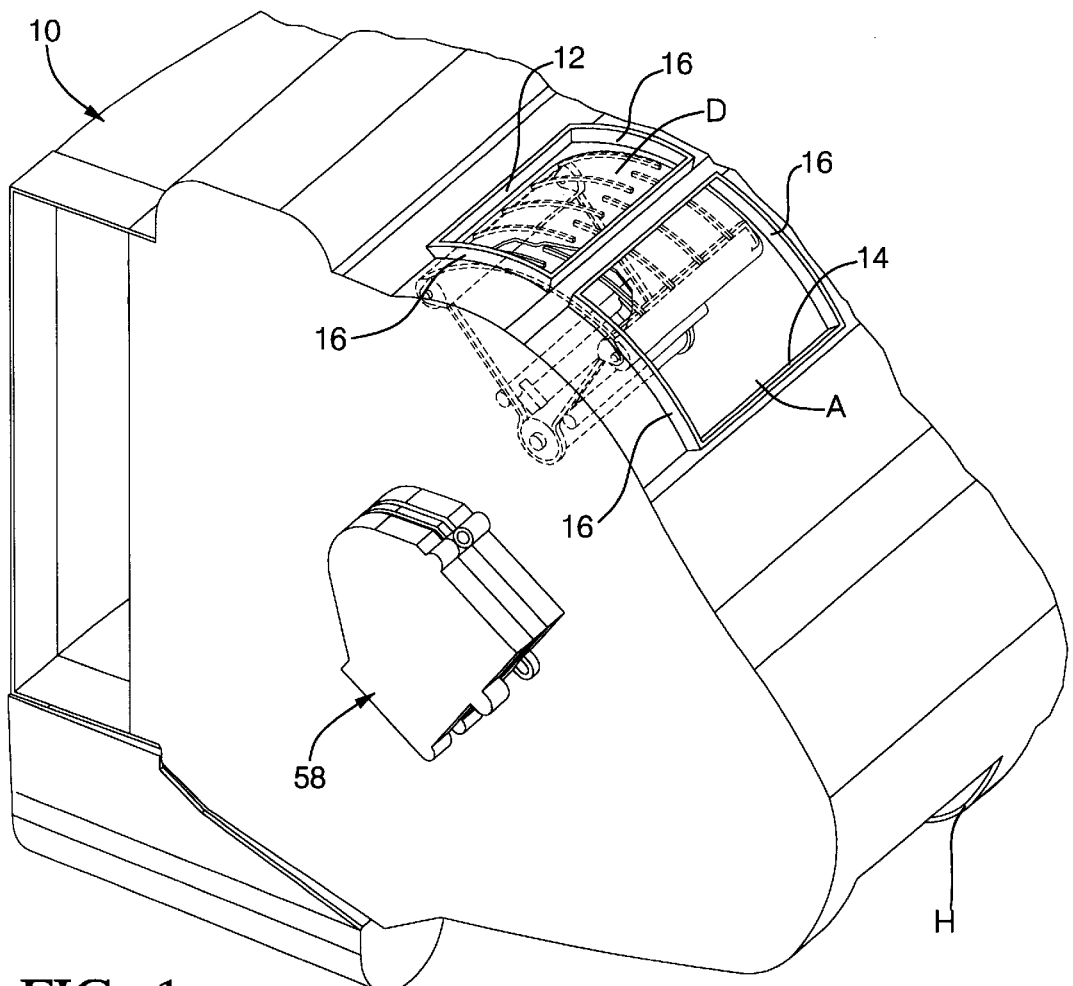
FIG. 1 is a perspective view of an automotive HVAC housing with a semi cylindrical outlet opening within which a rotary film valve according to the invention is incorporated.
Figure 6:
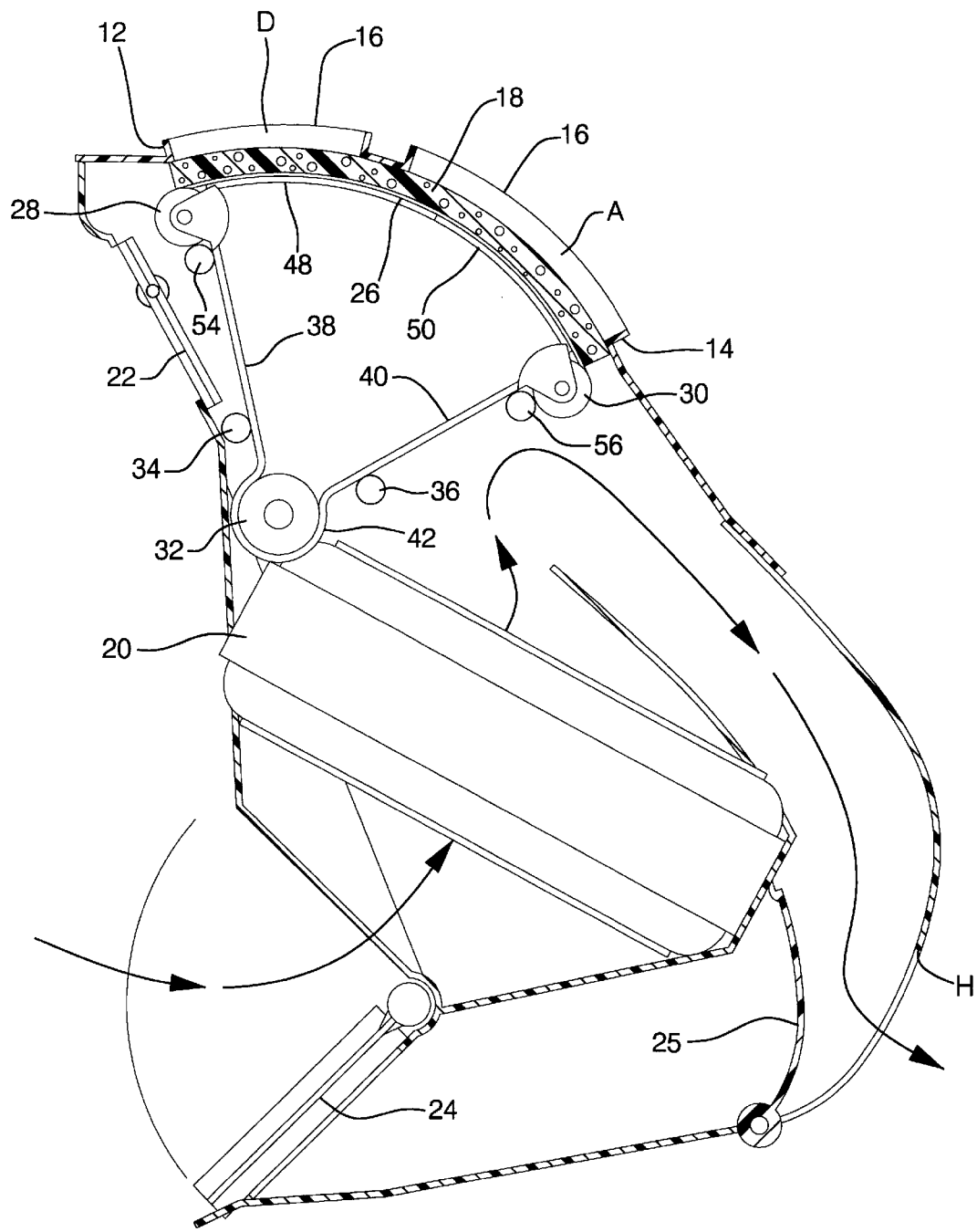
FIG. 6 is a view of the film valve installed within the housing and, as in FIG. 5, completely wound out and expanded to its greatest arcuate width, so as to cover the entire outlet opening.

Referring first to FIGS. 1 and 6, the environment in which the rotary film valve of the invention is incorporated is an automotive HVAC housing, indicated generally at 10, which has a curved air outlet opening with a perimeter defined by opposed upper and lower flat or straight edges 12 and 14, and opposed semi cylindrical curved edges 16, arrayed about a central axis X. The outlet opening is arbitrarily divided by a center rib into an upper, so called defrost opening D, and a lower, air conditioning opening A, but these lie on a common semi cylindrical envelope, and may be considered as one opening. A lower heater opening H rests well below the others, but is not directly covered or uncovered by the film valve of the invention. The interior surface of the perimeter of the outlet opening is comprised of a surrounding foam strip 18. Housing 10 includes several conventional components, including a heater core 20 and upper (22) and lower (24) by pass doors, which direct inlet air through or around heater core 20 to determine its temperature. In addition, a conventional flapper door 25 opens and closes the heater outlet opening H. These doors do not directly form part of the rotary film valve of the invention, but cooperate with it, as they would with a conventional, solid rotary valve, to direct air of the desired temperature through the selected outlet opening D, A or H. The various components of the rotary film valve of the invention are described next.

Figure 2:
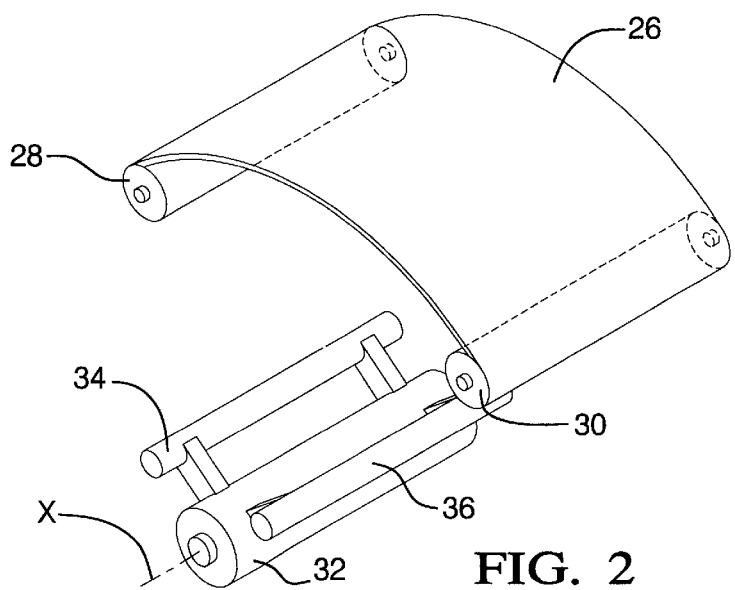
FIG. 2 is a perspective view of the film sheet, take up rollers, and part of the actuation means.

Referring next to FIG. 2, a thin, rectangular film sheet of mylar or other material sufficiently flexible to be repeatedly wound up and out is indicated at 26. Film sheet 26 is long enough and wide enough such that, when oriented in a semi cylindrical envelope about X, it can cover the entire opening. The structure that actually keeps sheet 26 in such a shape is described below. Each straight width edge of sheet 26 is connected to an identical cylindrical take up roller, including an upper roller 28 and lower roller 30, each of which corresponds to a respective outlet opening straight edge 12 and 14. Each roller 28 and 30 contains an internal spring, similar to a window shade roller, which act in opposition to continually wind the sheet 26 up if the rollers 28 and 30 swing toward one another, or to wind it out if they swing apart. FIG. 2 also illustrates one element of the valve actuation means, a rotary pusher block 32, also aligned on axis X. Pusher block 32 has a pair of identical, parallel rails 34 and 36, oriented in a V shape having approximately the same arcuate width or subtended angle as the outlet opening edges 12 and 14.

Figure 3:
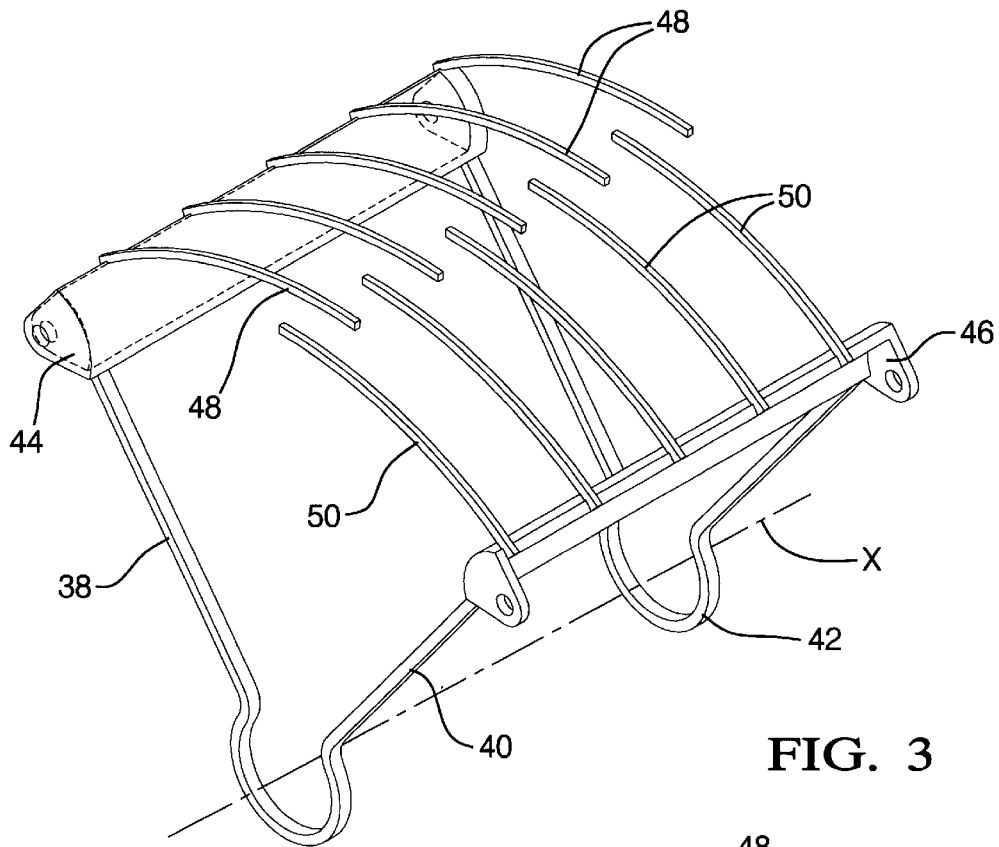
FIG. 3 is a perspective view of the supporting frame alone.

Referring next to FIG. 3, a film sheet supporting frame is comprised of an upper, two sided support leg 38 and a lower,
two sided support leg 40. At the base, the legs 38 and 40 are joined together by a pair of integral, C shaped rings 42, lying on the same central axis X. In the free state shown, the legs 38 and 40 are disposed in a V shape just slightly wider than the separation of the pusher block rails 34 and 36. At the top of each leg 38 and 40, the two sides are joined by an integral cross member 44 and 46 respectively. Cantilerved from each cross member 44 and 46 are staggered, interleaved and equal length arcuate support fingers 48 and 50, which are also concentric to axis X. In the free state of the support frame legs 38 and 40, the two sets of fingers 48 and 50 overlap slightly at the ends. If the legs 38 and 40 are pushed toward one another, the base rings 42 compress, and the support fingers 48 and 50 overlap more, swinging freely past one another about the axis X.

Figure 4:
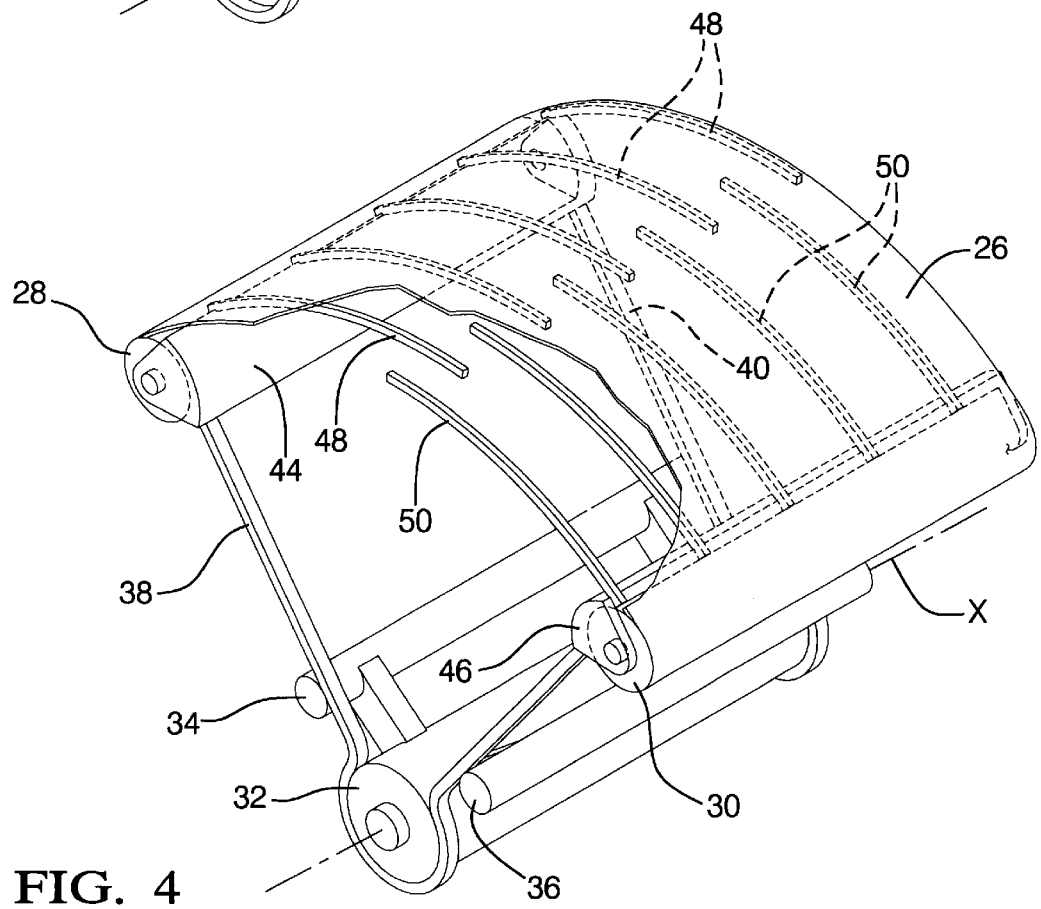
FIG. 4 is a perspective view of the entire rotary film valve and part of the actuation means, removed from the housing.

Referring next to FIG. 4, the components described above are assembled together to complete the rotary film valve of the invention, indicated generally at 52. Each roller 28 and 30 is journalled to a respective cross member 44 and 46, where it can turn freely about its own axis. The pusher block 32 is snapped within the base rings 42, and the rails 34 and 36 engage the outside of the support frame legs 38 and 40, holding them slightly inward from their free state separation, under a slight resilient compression in the base rings 42. The opposed biases of the spring loaded rollers 28 and 30 pull the film sheet 26 tightly over the support fingers 48 and 50, maintaining it in a convex semi cylinder concentric to the axis X.

Figure 5:
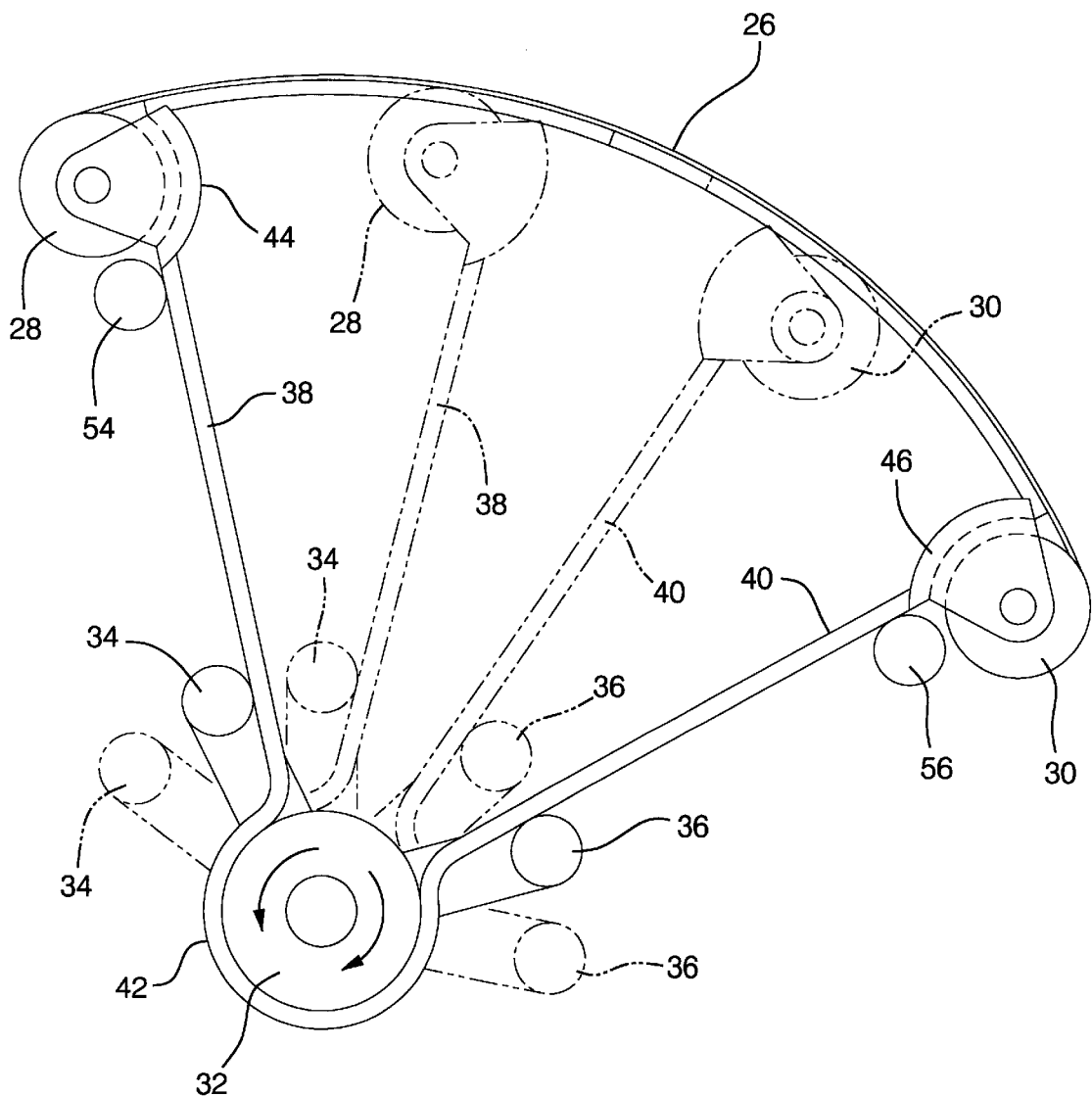
FIG. 5 is a side view of the film valve, showing the fully extended, unwound condition in solid line, and showing two possible contracted positions is dotted line.

Referring next to FIGS. 1, 5 and 6, film valve 52 is installed within HVAC housing 10 with the co axis of the pusher block 32 and rings 42 disposed on the same axis X as the outlet opening arcuate edges 16. Consequently, the outer surface of the curved film sheet can be closely engaged flush against the outlet opening's perimeter foam strip 18, forming a snug compression seal and covering the entire opening. Fixed to the interior of housing 10 are a pair of opposed stops, upper stop 54 and lower stop 56 which, relative to the axis X, are disposed in the same general V shape as the pusher block side rails 34 and 36. When film valve 52 is fully wound out and expanded, as shown in solid line in FIG. 5, the stops 54 and 56 just touch the outside of the legs 38 and 40 respectively. The fixed stops 54 and 56 work in cooperation with the pusher block 32 which, in turn, is rotated back and forth about axis X by a rotary actuator motor 58, as is described in more detail below. In the FIG. 6 position, the entire outlet opening is covered by the film sheet 26, edge to edge. Both temperature doors 22 and 24 are shown filly closed, and heater door 25 open, so that all of the inlet air is directed through heater core 20. The highly heated air is completely blocked from openings D and A by the film sheet 26, and directed entirely through the heater outlet opening H. This is typically referred to as the heat mode. The temperature doors 22 and 24 could, if desired, be open to an extent, to by pass some air around heater core 20 and consequently heat it less. The rotary valve 52 would not interfere with air flow past upper door 22 and down to opening H, since its wire frame construction is open.

Figure 7:
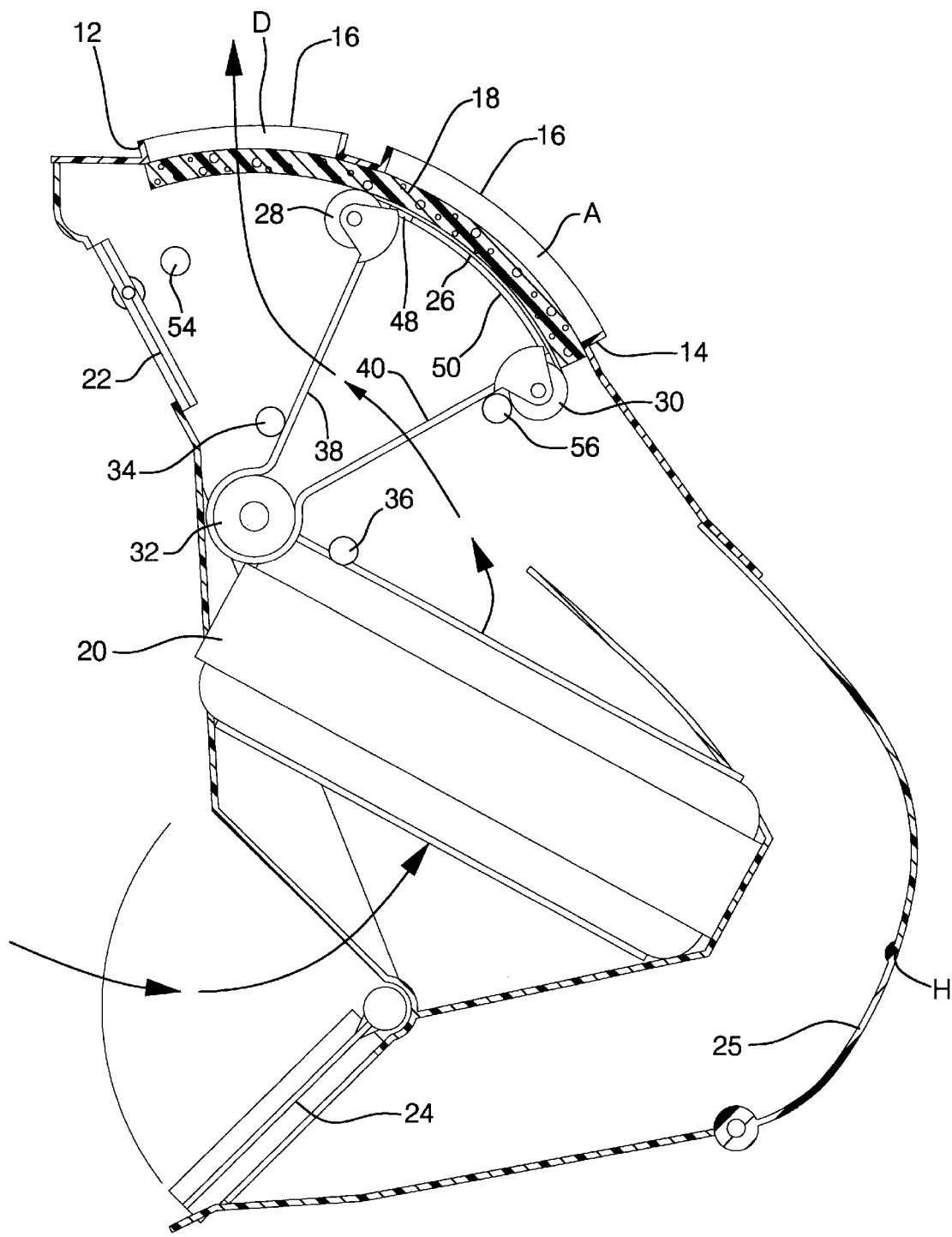
FIG. 7 is a view like FIG. 6, but showing the film valve rotated down and partially wound up, so as to uncover an upper portion of the outlet opening.

Referring next to FIGS. 5 and 7, the valve 52 is shown rotated down and closed up sufficiently to uncover the upper defrost opening D, while the opening A below remains covered. The heater door 25 is closed, and both by pass doors 22 and 24 are closed, so that highly heated air through heater core 20 is directed all through D and to the windshield, the so called defrost mode. In moving from the FIG. 6 to the FIG. 7 position, actuator motor 58 rotates the pusher block down, and the upper rail 34 pushes the upper frame leg 38 down, away from the upper fixed stop 54. The lower leg 40 is held in place by its contact with the lower fixed stop 56, so the lower pusher block 36 moves away and the upper leg 38 swings relatively toward it to compress the base rings 42, as shown in dotted line in FIG. 5. This compresses the base rings 42 and gives the legs 38 and 40 a stored energy tending to move them back apart. Concurrently, the upper take up roller 28 moves down and away from the outlet opening's upper straight edge 12, toward the other roller 30, and the interleaved sets of support fingers scissor past one another, overlapping more while remaining concentric to the axis X. The opposed biases of the two relatively approaching take up rollers 28 and 30 cause the film sheet 26 to be wound up, and keep it taught against the support fingers 48 and 50. The film sheet 26, as it winds up, is rolled up and away from the foam strip 18 without relative rubbing, like a carpet being rolled up from a floor. If the process were to be reversed, and actuator 58 reversed to move the upper rail 34 back, then the compressed base rings 42 would cause the upper frame leg 38 to swing back until it stopped against the upper fixed stop 54. The force in the compressed base rings 42 is strong enough to overcome the take up springs in the rollers 28 and 30, and the film sheet 26 would be wound off of the rollers 28 and 30 and back down onto the foam strip 18 in the same carpet like, non rubbing fashion.

Figure 8:
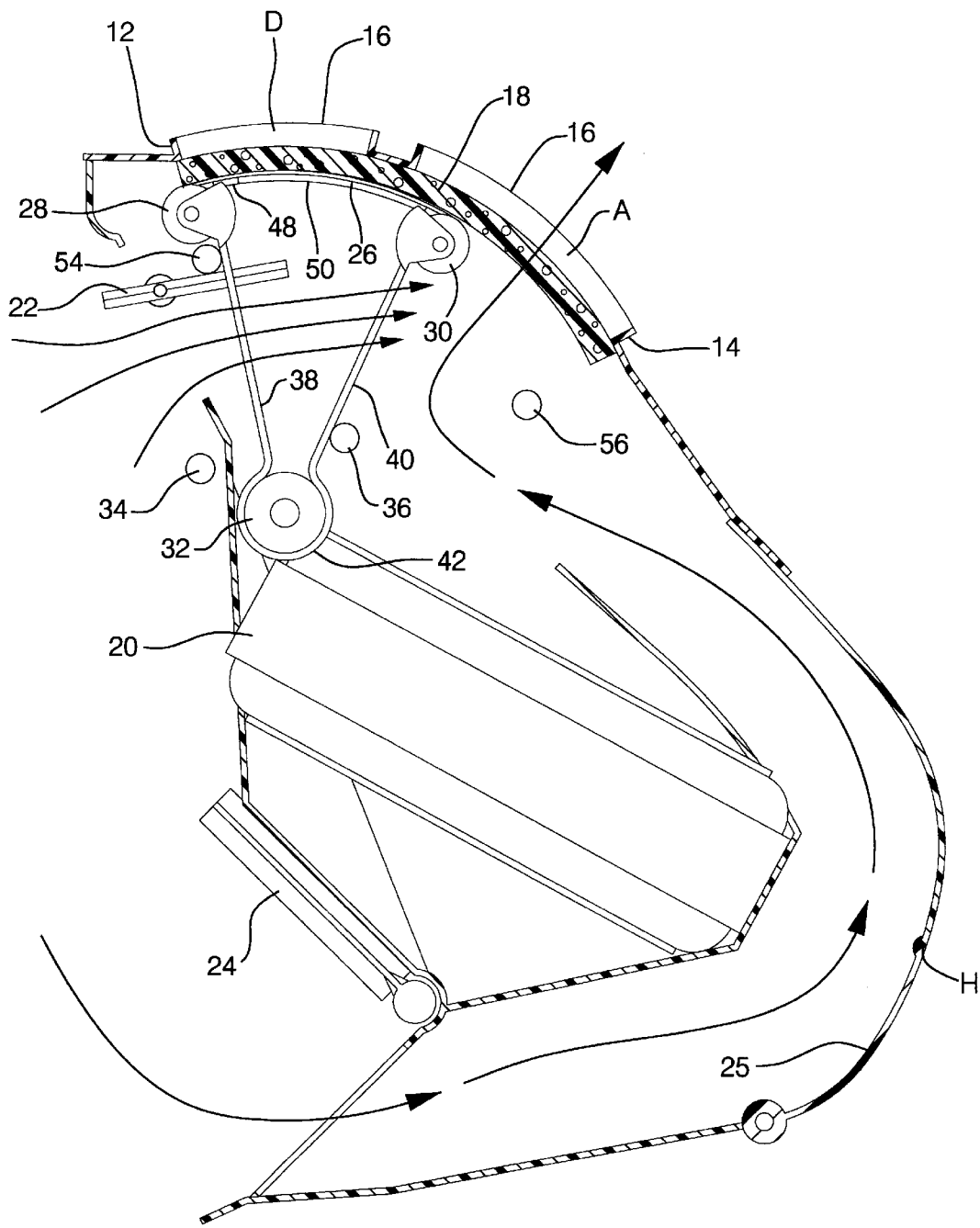
FIG. 8 is a view like FIG. 6, but showing the film valve rotated up and partially wound up, so as to uncover the lower portion of the outlet opening.

Referring next to FIGS. 5 and 8, the converse of the FIG. 7 position is shown. The by pass doors 22 and 24 are open, and the heater door 25 is closed, so that forced air by passes the heater core 20 and is directed up toward the underside of valve 52. Actuator 58 has rotated block 32 up, and lower rail 36 moves up to push lower frame leg 40 up and away from the lower fixed stop 56. Upper frame leg 38 remains against the upper fixed stop 54, so that lower leg 40 swings relatively toward it, as shown in dotted line in FIG. 5, and the base rings 42 are again compressed. The lower take up roller 30 moves away from the lower outlet opening straight edge 14, toward the upper roller 28, and the arcuate support fingers 48 and 50 scissor past one another, still remaining concentric to axis X. The opposed biases of the take up rollers 28 and 30 maintain film sheet taught against the fingers 48 and 50, and it is wound up and off of the foam strip 18 to uncover the opening A, without relative rubbing. It should be noted that the pusher block 32 could be rotated up or down through a lesser angle, uncovering either opening portion D or A correspondingly less, if desired. It should also be noted that neither roller 28 or 30 need overtravel past either straight edge 12 or 14 in order to fully uncover either opening portion A or D.

Variations in the preferred embodiment could be made. One or the other of the rollers and legs could be stationary, with only the other roller and frame leg movable toward or away from it. This would be a less flexible system, but would still roll the film sheet down or up in the same non rubbing fashion. Only the movable leg would absolutely need a take up roller, in that case, although two spring biased take up rollers would better balance the tension in the sheet, even if one of the rollers was stationary. The actuator means could be designed to swing the support frame legs 38 and 40 directly in each direction, together and apart, as opposed to simply pushing them together, with the stored bias in the base rings 42 being used to swing them back apart. However, the embodiment shown is simple and cost effective, since the actuator 58 only needs to push each leg 38 and 40, not also pull it, and the fixed stops 54 and 56 are easily provided. Therefore, it will be understood that it is not intended to limit the invention to just the embodiment disclosed.

I claim:

1. In an automotive heating, air conditioning and ventilation housing with an air opening oriented in a convex semi cylinder with first and second, opposed flat edges joined by opposed arcuate edges, the improvement comprising a self supporting, rotary film valve within said housing for selectively covering or uncovering said opening with substantially no rubbing against the surface of the interior perimeter of said opening, comprising:

a thin film sheet having first and second opposed edges corresponding to the opposed first and second flat edges of said opening, and with an outer surface facing the interior perimeter of said opening and large enough in area to block said opening, said film sheet being sufficiently flexible to be rolled repeatedly up and out;

a support frame having a support leg which is swingable in an arc generally along said opening's arcuate edges and toward and away from one of said flat edges;

a cylindrical roller attached to one of and supported on said support leg so as to be rotatable about its own axes and to swing concurrently along said opening's arcuate edges and toward and away from one of said opening's first and second flat edges;

means continually biasing said roller to rotate about its own axis so as to concurrently roll said film sheet up and onto said roller as said roller move away from said opening's one flat edge;

interleaved arcuate support fingers on said support frame leg and support frame matching the curvature of said opening's arcuate edges and continually tensioned against the inner surface of said film sheet so as to maintain said film sheet closely engaged with the surface of the interior perimeter of said opening; and, an actuator to selectively swing said support frame's support leg relatively away from said housing opening's one flat edge and roll said film sheet up and onto said roller, or to swing said frame support leg relatively toward said one flat edge and thereby roll said film sheet out and off of said roller;

whereby, as said actuator swings said roller back and forth, said film sheet is rolled up on said roller and away from said opening's interior perimeter or rolled off of said roller and onto said opening's interior perimeter to uncover or cover said opening without substantial rubbing of said film sheet against the surface of said opening's interior perimeter.

2. In an automotive heating, air conditioning and ventilation housing with an air opening oriented in a convex semi cylinder with first and second, opposed flat edges joined by opposed arcuate edges, the improvement comprising a self supporting, rotary film valve within said housing for selectively covering or uncovering said opening with substantially no rubbing against the surface of the interior perimeter of said opening, comprising:

a thin film sheet having first and second opposed edges corresponding to the opposed first and second flat edges of said opening, and with an outer surface facing the interior perimeter of said opening and large enough in area to block said opening, said film sheet being sufficiently flexible to be rolled repeatedly up and out;

a support frame having first and second legs swingable in an arc generally along said opening's arcuate edges and toward and away from said flat edges;

first and second cylindrical rollers attached to said film sheet's first and second edges and supported on said support frame's first and second legs so as to be rotatable about their own axes and to swing concurrently along said opening's arcuate edges and toward and away from said opening's first and second flat edges;

means continually biasing said rollers to rotate about their own axes so as to concurrently roll said film sheet up and onto said rollers as said rollers move away from said opening's first and second flat edges;

interleaved arcuate support fingers on said support frame legs matching the curvature of said opening's arcuate edges and continually tensioned against the inner surface of said film sheet so as to maintain said film sheet closely engaged with the surface of the interior perimeter of said opening; and, an actuator to selectively swing said support frame's first and second support legs relatively together and thereby move said rollers away from their respective housing opening flat edges and roll said film sheet up and onto said rollers, or to swing said frame support legs relatively together to move said rollers back toward their respective flat edges and thereby roll said film sheet out and off of said rollers;

whereby, as said actuator swings said rollers back and forth, said film sheet is rolled up on said rollers and away from said opening's interior perimeter or rolled off of said rollers and onto said opening's interior perimeter to uncover or cover said opening without substantial rubbing of said film sheet against the surface of said opening's interior perimeter.

3. In an automotive heating, air conditioning and ventilation housing with an air opening oriented in a convex semi cylinder with first and second, opposed flat edges joined by opposed arcuate edges, the improvement comprising a self supporting, rotary film valve within said housing for selectively covering or uncovering said opening with substantially no rubbing against the surface of the interior perimeter of said opening, comprising:

a thin film sheet having first and second opposed edges corresponding to the opposed first and second flat edges of said opening, and with an outer surface facing the interior perimeter of said opening and large enough in area to block said opening, said film sheet being sufficiently flexible to be rolled repeatedly up and out;

a support frame having first and second legs swingable in an arc generally along said opening's arcuate edges and toward and away from said flat edges;

first and second cylindrical rollers attached to said film sheet's first and second edges and supported on said support frame's first and second legs so as to be rotatable about their own axes and to swing concurrently along said opening's arcuate edges and toward and away from said opening's first and second flat edges;

means continually biasing said rollers to rotate about their own axes so as to concurrently roll said film sheet up and onto said rollers as said rollers move away from said opening's first and second flat edges;

means continually biasing said supporting frame legs so as to move said rollers toward said opening's flat edges and thereby roll said film sheet out and off said roller in opposition to said rollers' bias;

interleaved arcuate support fingers on said support frame legs matching the curvature of said opening's arcuate edges and continually tensioned against the inner surface of said film sheet so as to maintain said film sheet closely engaged with the surface of the interior perimeter of said opening; and, cooperating actuators and stops to selectively swing said support frame's first and second support legs in opposition to their bias and thereby move said rollers away from their respective housing opening flat edges and thereby roll said film sheet up and onto said rollers, or to release said frame support legs to move said rollers back toward their respective flat edges and thereby roll said film sheet out and off of said rollers;

whereby, as said actuator swings said rollers back and forth, said film sheet is rolled up on said rollers and away from said opening's interior perimeter or rolled off of said rollers and onto said opening's interior perimeter to uncover or cover said opening without substantial rubbing of said film sheet against the surface of said opening's interior perimeter.

* * * * *